F. Blecka,
Cheese Box.
No. 96,302. Patented Nov. 2, 1869.

WITNESSES:
James Coleman
A. B. Whitcomb

INVENTOR:
Frank Blecka

United States Patent Office.

FRANK BLECKA, OF ELGIN, ILLINOIS.

Letters Patent No. 96,302, dated November 2, 1869; antedated October 22, 1869.

IMPROVED CHEESE-BOX.

The Schedule referred to in these Letters Patent and making part of the same.

*To all whom it may concern:*

Be it known that I, FRANK BLECKA, of Elgin, in the county of Kane, and State of Illinois, have invented a new and useful Improvement in Cheese-Boxes; and I do hereby declare that the following is a full, clear, and exact description of the construction and operation of the same, reference being had to the annexed drawing, and to the letters of reference marked thereon, making a part of this specification, in which—

My invention is an improvement in that class of round pasteboard boxes which is made for the purpose of transporting cheese and rolled butter.

To enable others to construct and use my improvement, I will describe the same with reference to the accompanying drawing.

A represents the ouside body of the box, the same being made of pasteboard, and being provided around the bottom with a band, H, made of wood or pasteboard.

B represents the plates or slivers, the same being made of wood, and firmly attached to the inside of the body of the box A, the plates being placed so as to allow of the air penetrating when the box is tightly closed with cheese, that is to say, allowing an interval between each plate or sliver.

Figure 1:
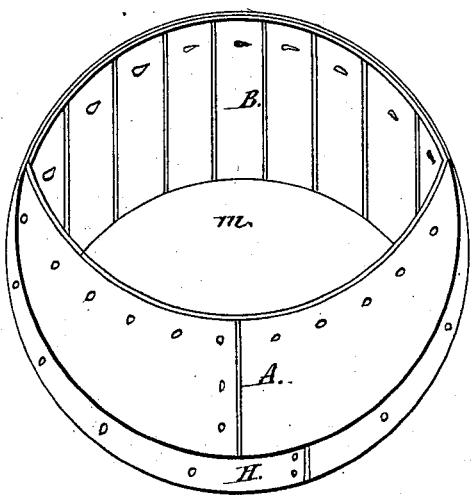
Figure 1 is a perspective view, showing the plan of the plates or slivers, placed in a perpendicular position around the inside of the box.
Figure 2:
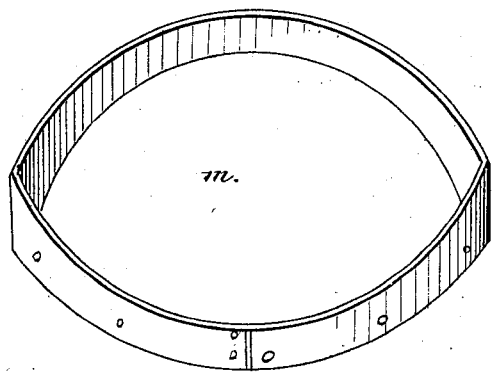
Figure 2 is a transverse section, representing the cover of said box.

$m'$ $m''$ represent the head and bottom, as shown at fig. 1 and fig. 2 in the accompanying drawing, the same being made of wood, tightly fitted and substantially nailed within the circumference, as in figs. 1 and 2.

The objects of this style of arrangement are several:

First, the plates being made of substantial wood, protect the box from jamming in shipping and storing the cheese.

Secondly, the plates being made of wood, the outside hoop being made of pasteboard, the same being attached to each other by means of clout-nails, the said nails clinch within the wood substantially, and it is found beneficial in protecting the cheese from moulding when formed with intervals, as shown at B, fig. 1.

The nature of my invention consists in having wooden linings or plates on the inside of the box, as before mentioned. Said plates consist of narrow strips, and are placed in the box in such a manner as to allow the cavities between each plate to admit a constant free circulation of fresh air through the box, when closed and containing cheese, by means of which arrangement moisture is carried off and the cheese is prevented from acquiring the unpleasant and offensive taste of paper which it would otherwise acquire from dampness.

The box is preserved in a good dry condition, and the cheese is thus protected from moulding.

In consequence of the great length of time cheese is obliged to remain in many warehouses, much inconvenience is experienced with the old form of cheese-boxes made of paper. The cheese being kept from the air, the result is that it will become heated, which heat is caused by confined air, and causes the cheese to mould.

Thirdly, the plates or slivers being made of substantial wood, and placed in an upright position for the purpose of embracing the box in perpendicular directions, whereby sufficient elevation of said box is attained, so as to admit two cakes of cheese into one box.

Fourthly, the wooden linings, or said plates or slivers B attached to the inside of the box for the purpose of disconnecting the paper from the cheese, prevent the soakage of grease or butter by the paper, which grease or butter is contained within the body of the cheese. For this purpose I form the box with wooden head and bottom $m$ $m$, as shown at fig. 1 and fig. 2.

Having thus described the nature and object of my invention, I disclaim against the use of pasteboard boxes, generally considered.

What I claim as my invention, and desire to secure by Letters Patent, is—

The application of the wooden plates or slivers to pasteboard hoops, as hereinbefore described, for the purpose set forth.

FRANK BLECKA.

Witnesses:
A. B. WHITCOMB,
JAMES COLEMAN.